United States Patent
Kale et al.

(10) Patent No.: US 8,565,139 B2
(45) Date of Patent: Oct. 22, 2013

(54) METHODS AND APPARATUS FOR WAN/WLAN UNICAST AND MULTICAST COMMUNICATION

(75) Inventors: Kaustubh Kale, Tamarac, FL (US); William J. Sakoda, E. Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 310 days.

(21) Appl. No.: 12/608,302

(22) Filed: Oct. 29, 2009

(65) Prior Publication Data

US 2011/0103283 A1 May 5, 2011

(51) Int. Cl.
*H04H 20/71* (2008.01)

(52) U.S. Cl.
USPC ............ 370/312; 370/328; 370/349; 370/401

(58) Field of Classification Search
USPC ........... 370/311, 312, 338, 340, 401; 455/502
See application file for complete search history.

(56) References Cited

U.S. PATENT DOCUMENTS

| | | | |
|---|---|---|---|
| 7,460,495 B2 | 12/2008 | Li | |
| 7,493,413 B2 | 2/2009 | Gupta et al. | |
| 2003/0053434 A1 | 3/2003 | Chow et al. | |
| 2005/0037787 A1* | 2/2005 | Bachner et al. | 455/502 |
| 2006/0039388 A1* | 2/2006 | Shur et al. | 370/401 |
| 2008/0151876 A1 | 6/2008 | Wilson et al. | |
| 2008/0240096 A1 | 10/2008 | Botha et al. | |
| 2008/0247373 A1* | 10/2008 | Synnergren et al. | 370/340 |
| 2009/0003252 A1* | 1/2009 | Salomone et al. | 370/311 |
| 2009/0052415 A1* | 2/2009 | Ishii et al. | 370/338 |

OTHER PUBLICATIONS

International Search Report and Written Opinion dated Feb. 7, 2011 in related case PCT/US2010/053490.
Imed Romdhani et al. "IP Mobile Multicast: Challenges and Solutions" IEEE Communications Surveys, IEEE New York, NY Jan. 1, 2004.
International Preliminary Report on Patentability and Written Opinion for counterpart International Patent Application No. PCT/US2010/053490 issued on May 1, 2012.

\* cited by examiner

*Primary Examiner* — Brian D Nguyen
*Assistant Examiner* — Toan Nguyen
(74) *Attorney, Agent, or Firm* — Randi L. Karpinia; Michael J. Giannetta

(57) ABSTRACT

IP unicast communication is provided between mobile devices in a wide area network and a wireless local area network coupled by a gateway component. Data communication is established between a mobile device and the wireless local area network, thereby receiving a first unicast IP address associated with the mobile device. A multicast group is joined within the wireless local area network and registering with that multicast group using a predetermined multicast IP address as a destination IP address and the first unicast IP address as a source address. The device disconnects from data communication within the wireless local area network, thereby releasing the first unicast IP address. Data communication is established between the mobile device and the wide area network, thereby receiving a second unicast IP address associated with the mobile device. The device then automatically communicates with the gateway component, via the wide area network, to specify the second unicast IP address as the source address for the mobile device within the multicast group.

15 Claims, 3 Drawing Sheets

METHODS AND APPARATUS FOR WAN/WLAN UNICAST AND MULTICAST COMMUNICATION

The present invention generally relates to unicast and multicast communication used in connection with mobile devices, and more particularly relates to the use of such devices and protocols in both WAN and WLAN environments.

BACKGROUND

Unicast and multicast IP communication has achieved wide popularity in contexts where multiple mobile devices are used within an enterprise. Push-to-talk (PTT) is one of the more requested features in markets that require the integration of traditional walkie-talkie functionality into powerful mobile data devices, and whose primary voice requirement is one-to-many paging and one-to-one direct local dialing.

Presently known IP unicast and multicast systems are undesirable in a number of respects. For example, there are many organizations where employees are located within a wireless local area network (WLAN) for part of the day, and outside the local area network (i.e., within a WAN) for the rest of the day. While it is possible to tie PSTN and VOIP networks to provide walkie-talkie functionality between the WLAN and WAN, such solutions require the use of additional servers and other infrastructure, and do not provide a seamless communication experience to the user.

Accordingly, there is a need for seamless, serverless integration of multicast/unicast functionality in both WAN and WLAN environments. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

In general, the present invention relates to systems and methods for providing IP unicast communication, such as push-to-talk (PTT) communication, between mobile devices across WAN and WLAN systems without requiring dedicated servers for that purpose.

In one embodiment, data communication is first established between a mobile device and the wireless local area network, thereby receiving a first unicast IP address associated with the mobile device. The mobile device then joins a multicast group within the wireless local area network and registers with that multicast group using a predetermined multicast IP address as a destination IP address and the first unicast IP address as a source address. The device disconnects from data communication within the wireless local area network, thereby releasing the first unicast IP address. Data communication is established between the mobile device and the wide area network, thereby receiving a second unicast IP address associated with the mobile device. The device then automatically communicates with the gateway component, via the wide area network, to specify the second unicast IP address as the source address for the mobile device within the multicast group.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to user interface components, network communication, multicasting, mobile computing devices, and the like, need not be described herein.

Figure 1:
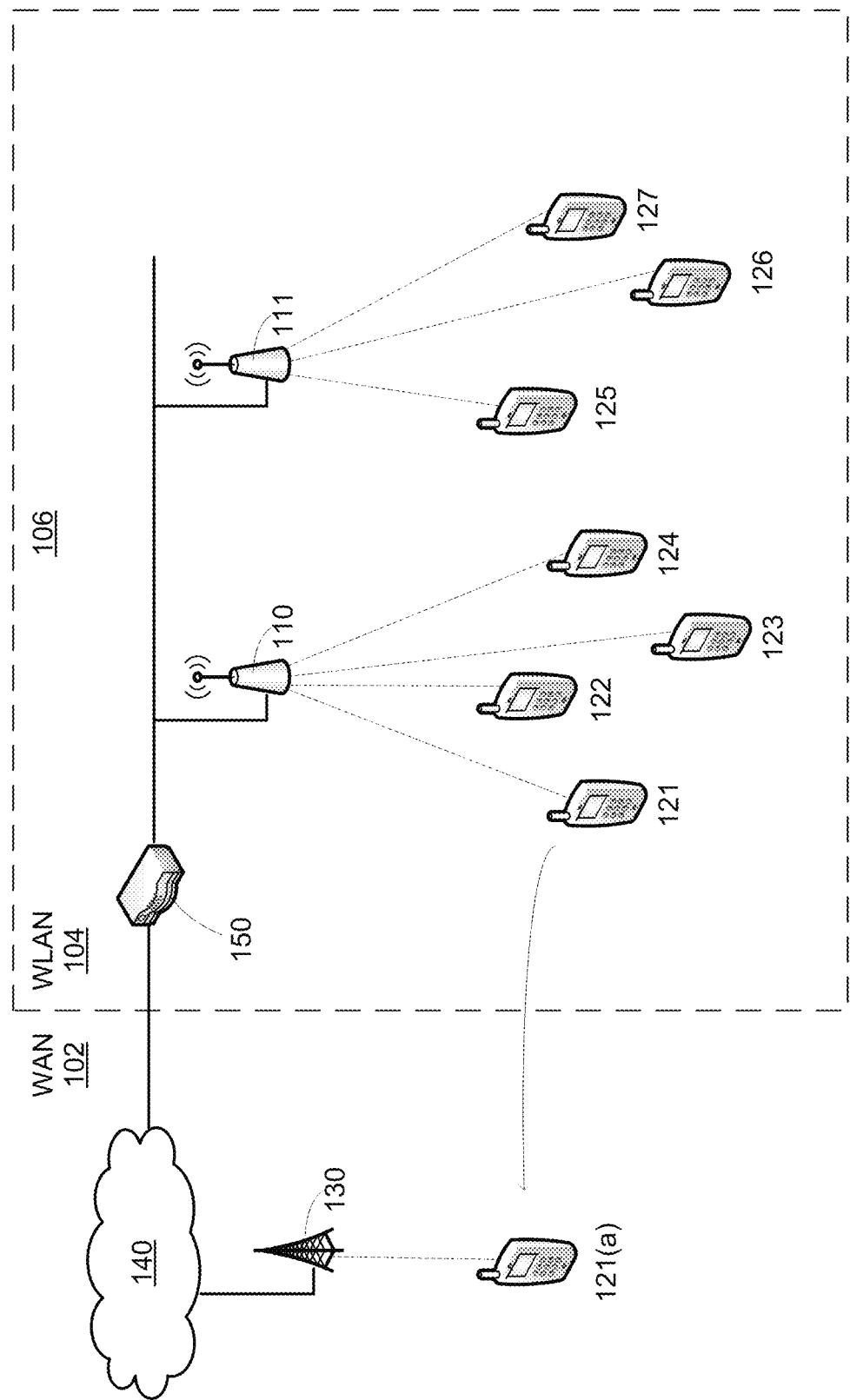
FIG. 1 depicts exemplary WAN/WLAN environments useful in describing the present invention.

Referring now to FIG. 1, an example wireless network useful in illustrating operation of the present invention will now be described. As shown, a wide area network (WAN) 102 and wireless local area network (WLAN) 104 are coupled via a gateway component ("IP gateway" or simply "gateway") 150 in the conventional manner. WLAN 104 may be limited to a single facility 106 or may extend to any number of such facilities, campuses, workplaces, and the like.

WLAN 104 will typically include one or more access points (or ports) 110 and 111, which are communicatively coupled to gateway 150 and are configured to associate with, and facilitate wireless communication for, any number of mobile devices (e.g., mobile devices 121-127). In the illustrated embodiment, WLAN 104 operates in accordance with an IEEE 802.11 protocol, as is known in the art. WLAN 104 will typically include a number of other components, such as routers, switches, and the like, which for the purpose of clarity are not illustrated in the figure.

WAN 102 generally includes a network 140 (e.g., the Internet) and one or more cell towers or other components 130 configured to wirelessly communicate with mobile devices 121-127. As is known, a WAN is a network that covers a relatively broad geographical area (in contrast to a WLAN) and is typically accessed through the public switched telephone network (PSTN), leased lines, satellites, and the like.

As mentioned previously, modern IP packet switched networks such as WLAN 104 provide for multicasting—that is, the ability for mobile devices 121 to join (or register) with one or more multicasting groups within WLAN 104. Once a mobile device 121 is a member of a group, it can then receive any messages and data (e.g., IP datagrams) sent to that group via WLAN 104. One such multicasting protocol is provided by IGMP (Internet Group Management Protocol), which will be referred to herein without loss of generality.

In accordance with the present invention, a mobile device 121 may seamlessly "roam" between WAN 102 and WLAN 104 while preserving the ability to receive multicast messages for groups that it has joined. Furthermore, this functionality is provided without requiring additional servers for managing the routing of messages.

In general, an exemplary method proceeds as follows. First, WLAN 104 (e.g., IP gateway 150 and mobile devices 121-127) are pre-configured to implement the method described herein. This involves, at the outset, storing the public IP address of gateway 150 within mobile device 121, and installing suitable client software (described in further detail below) within mobile device 121.

Next, data communication is established between mobile device 121 and WLAN 104, e.g., through a conventional IEEE 802.11 association procedure. In the course of establishing this communication, mobile device 121 acquires a first unicast IP address used for subsequent communication within WLAN 104.

Mobile device 104 then joins a multicast group within WLAN 104, specifying its current IP address as its multicast network address—i.e., the address to which multicasts for that group should be routed. That is, a predetermined multicast IP address is used as a destination IP address, and the first unicast IP address is used as a source address during registration. In the illustrated embodiment, an IGMP multicast protocol is followed. In such a case, gateway 150 and access points 110, 111, together with other network components (such as switches and the like) will typically administer any routing tables used for providing the multicasting.

At this point, mobile device is configured to send and receive unicast and multicast messages with respect to other mobile devices 122-127 within WLAN 104.

Next, the user leaves facility 106, thereby disconnecting from WLAN 104. This releases the first unicast IP address. At this point, mobile device 121 (shown as 121(a)) may establish data communication with WAN 102 using any suitable method, depending upon the nature of the network. As a result, mobile device 121 receives a second unicast IP address, which it preferably stores in addition to the first IP address used for WLAN 104.

After receiving the unicast IP address for WAN 102, mobile device 121 utilizes the stored public IP address of gateway 150 to automatically communicate with gateway 150, via WAN 102, and to specify that this second WAN IP address is its new multicast network address. Gateway 104 processes this request, and thereafter all multicast messages sent to that group are sent to the WAN IP address rather than the WLAN IP address.

Conversely, when mobile device 121 leaves WAN 102 and returns to WLAN 104, a message is automatically sent to gateway 150 instructing it to use the previous IP address (or a newly acquired IP address) as its current multicast address. In a typical embodiment, device 121 gets a new IP address from the network, and there is no guarantee that this IP address will be the same as any previous IP address.

The mobile device may be configured to provide any number of different communication services in this context, including, for example, walkie-talkie service, push-to-talk service, and the like. In various embodiments, simultaneous communication of voice, data, video, text, and/or images is provided.

Figure 2:
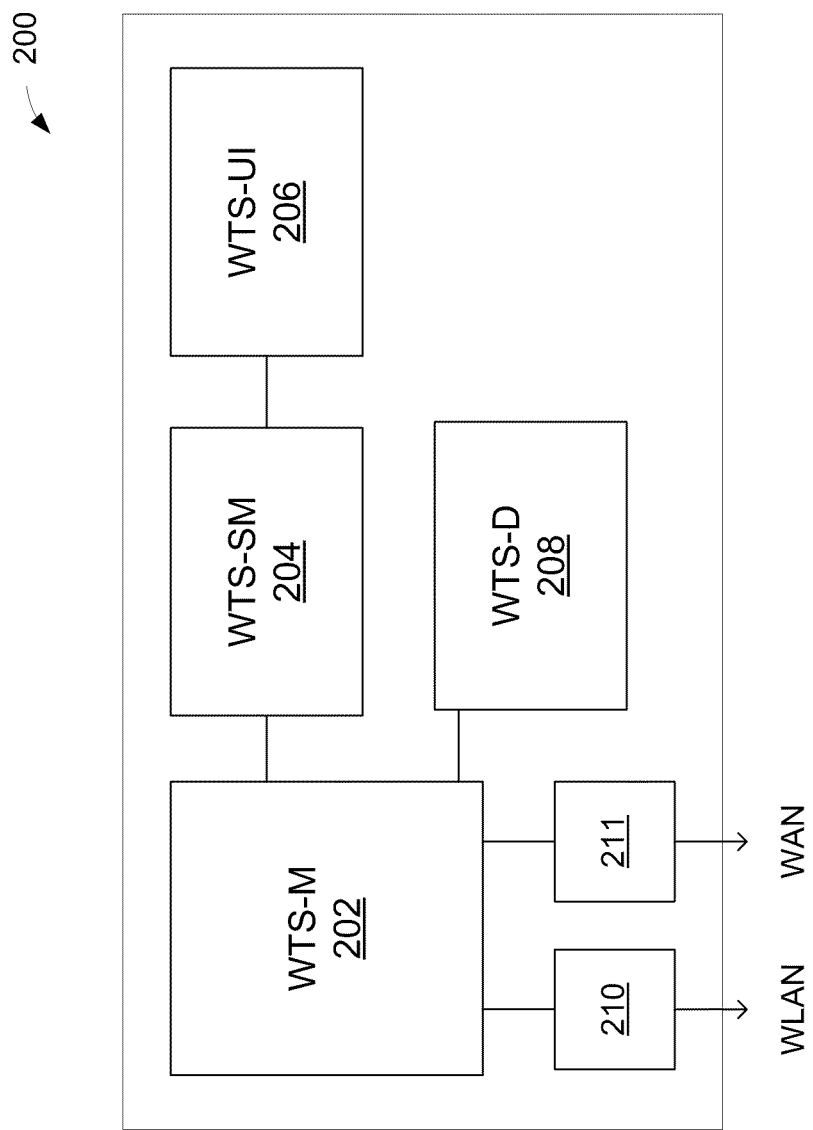
FIG. 2 is a conceptual block diagram of various functional blocks included in an exemplary mobile device.

As mentioned previously, the intelligence for providing seamless movement between WAN 102 and WLAN 104 is provided, for the most part, by the mobile device itself, rather than a dedicated server for handling routing tables and the like. Therefore, as depicted conceptually in FIG. 2, mobile device 121 will include a number of functional modules implemented via any combination of hardware and software, including a walkie-talkie seamless driver (WTS-D) 208, a walkie-talkie seamless session manager (WTS-SM) 204, a walkie-talkie seamless user interface (WTS-UI) 206, a walkie-talkie seamless manager (WTS-M) 202, a wireless driver 210 for WLAN 104, and a wireless driver 211 for communicating with WAN 102.

WTS-D 208 is responsible for UDP traffic handling from a socket (e.g., a windows socket). It manages jitter, quality-of-service (QoS) packet tagging, encoding/decoding of data, and UDP package management. It may also be responsible for IGMP to register for multicast traffic. It also handles incoming audio traffic to determine whether it is intended for the walkie-talkie (WT) service within the mobile device.

WTS-SM 204 is responsible for managing any voice sessions established for one-to-one communication, or listening to WT chatter on a particular channel, or managing sessions for any video/text/data/voice served being used. It therefore provides the application layer logic.

From a user viewpoint, a session is a number of people talking briefly about a particular topic, then "being done." The concept of a session in WTS is useful in a number of respects, for example: it allows a user to block one session on a channel while allowing the next to be heard; it allows a device to enter special operating modes that optimize voice performance and/or user experience; and it simplifies the user interface behavior when a user needs to respond on a channel that is not the one they normally use.

WTS-M is responsible for acquiring the unicast IP address on power-up from the wireless driver, or in the event of IP address change when the device transitions between networks, WTS-M 202 is responsible for associating the IP assigned with the current data network in use, e.g., WAN (packet data network, 3G, EDGE, etc.) or WLAN (local WiFi 802.11 network, etc.) The logic of initiating a communication with gateway 150 or APs 110/111 to change the source IP address for the multicast group resides in WTS-M 202. Its responsibility is to make sure that the correct source IP address is updated within WLAN 104 such that multicast packets are routed to device 121.

As noted above, WTS-D 208 provides a plurality of independent streams of conversation. One mechanism by which this may be provided will now be described.

In one embodiment, WTS-D 208 distinguishes channels based on different UDP port numbers. Given a base UDP port, U, and a channel, N, the channel is identified as UDP port U+(N*2). With this approach, a large number of channels can be defined.

The same UDP port is preferably always used for a given channel, with different sessions on the same channel identified by the SSRC field in the RTP header. If possible, the source and destination UDP port numbers are the same, although this is not required by the protocol and may not be possible on some systems.

In order to optimize implementation on a variety of operating systems, WTS-D 208 also maps the channel number onto both a range of class D IP addresses and a range of 802.11 MAC multicast addresses. The algorithm, in accordance with one embodiment, is similar to that used for UDP port numbers, i.e.: for a given channel, N, and a base class D IP address of I, the address I+N will be used for all channel N traffic. In the same way, given a base MAC multicast address of value M, address M+N will be used for all channel N traffic.

The base UDP port number, class D IP address, and 802.11 Multicast address are configuration items that are preferably set on each device (and are the same for each device). For example, in a particular client network, the class D IP address for multicast for channel 2 may be 224.0.0.2, and with base UDP port of 10000, the transmission for channel 2 would be provided on port 10002. Thus, WTS-D sends and listens to the RTP audio traffic for channel 2 on 224.0.0.2:10002.

WTS-M 202 receives the IP address on power-up from the wireless driver, while the device in the facility gets a local IP address of, for example, 173.1.1.100, and the WT port and the multi-cast IP are predefined, e.g., 224.0.0.2:10002.

WTS-M 202 may have a variety of functions to provide the desired WT functionality. For example, in one embodiment, the following functions are provided: WTS_Initialize, WTS_Set_String_Property, WTS_Set_Integer_Property, WTS_Create, WTS_Start, WTS_Set_Text, WTS_Announcement_Start, WTS_Send_Audio, WTS_Announcement_Stop, WTS_Get_Sender_Ip, WTS_Get_Text, WTS_Receive_Audio, WTS_Set_Filler_Callback, WTS_Destroy, and WTS_Shutdown.

To start a session, then, the module calls:

int WTS_Initialize(int multicastIp, int RTPport);

This returns a pointer to the WTS_INSTANCE for a particular channel and multicast IP. As a result, all future call flows are followed using the returned WTS_INSTANCE. For example, to start a WT call, the following command may be used:

int WTS_Start(WTS_INSTANCE wts_instance);

Subsequently, when the device roams outside of a WiFi coverage area, the wireless driver automatically registers with the packet data within WAN 102 to get a new IP address, e.g., 10.0.0.45. This change is detected by WTS_M 202, and it thereafter sends a multicast registration packet using IGMP to the predetermined (and pre-stored) public IP address (e.g., 123.123.123.123) belonging to gateway 150.

Gateway 150 then automatically re-routs packets from 10.0.0.45:10002 to 224.0.0.2:10002. Device 121, which is now outside WLAN 104, is able to send multicast traffic to the WT group within WLAN 104. In the reverse direction, the IP gateway 150 receives multicast packets for 224.0.0.2:100002, which it then routes to 10.0.0.45:1002. Thus, the device operating in WAN 102 is able to receive WT chatter as if it were registered on WLAN 104.

IP gateway 150, which may implement a NAT, firewall, or the like, can support a direct mapping between external IP addresses and internal IP addresses, or support a full cone NAT (one-to-one NAT). Once an internal address (iAddr:port1) is mapped to an external address (eAddr:port2), any packets from iAddr:port1 will be sent through eAddr:port2. Any external host can send packets to iAddr:port1 by sending packets to eAddr:port2.

While it is often desirable to avoid NAT entirely, if a public IP address is available for a networks call server, it is advantageous to use it if available. If gateway 150 is connected to both network 140 and WLAN 104, an RTP port is reachable from both inside and outside WLAN 104, and the primary concern then becomes ensuring that RTP flows properly. Gateway 150 need not be configured to route between interfaces or provide masquerading; it simply bridges the inbound and outbound RTP traffic.

In one example (assuming gateway 105 utilizes the Linux operating system), the following form of configuration may be used:

```
iptables -t nat -A PREROUTING -i etho -p udp \
-m udp --dport 10000:10100 -j DNAT \
--to-destination 192.168.1.10
```

Where etho is replaced with the outside interface of the firewall (e.g., 123.123.123.123), and 192.168.1.10 is replaced with the address of the multicast traffic (224.0.0.2). These rules instruct the Linux kernel to translate the destination address of any UDP packets in a given range that are entering the outside interface. This happens at the pre-routing stage as opposed to the post-routing stage, because the destination address is being translated. At this point, RTP packets from network 140 will be forwarded to the internal multicast address.

The user interface provided by WTS-UI 206 to implement the methods described above may vary depending upon, for example, the hardware and software platforms being used. The user interface may include any number of conventionally known elements, such as windows, text boxes, input boxes, check boxes, radio buttons, toggle buttons, standard buttons, sliders, touch-sensitive areas, drop-down menus, and the like.

The user interface details and methods described above may be implemented in a variety of mobile devices 121, including, for example, cellular phones (or "smartphones"), GPS systems, e-book readers, tablet computers, netbook computers, point-of-sale devices, gaming devices, and any other apparatus that may include more than one touchscreen display. In general, however, such devices are typically special-purpose or general-purpose computing devices including one or more microprocessors, memory components, and the like as is known in the art.

Figure 3:
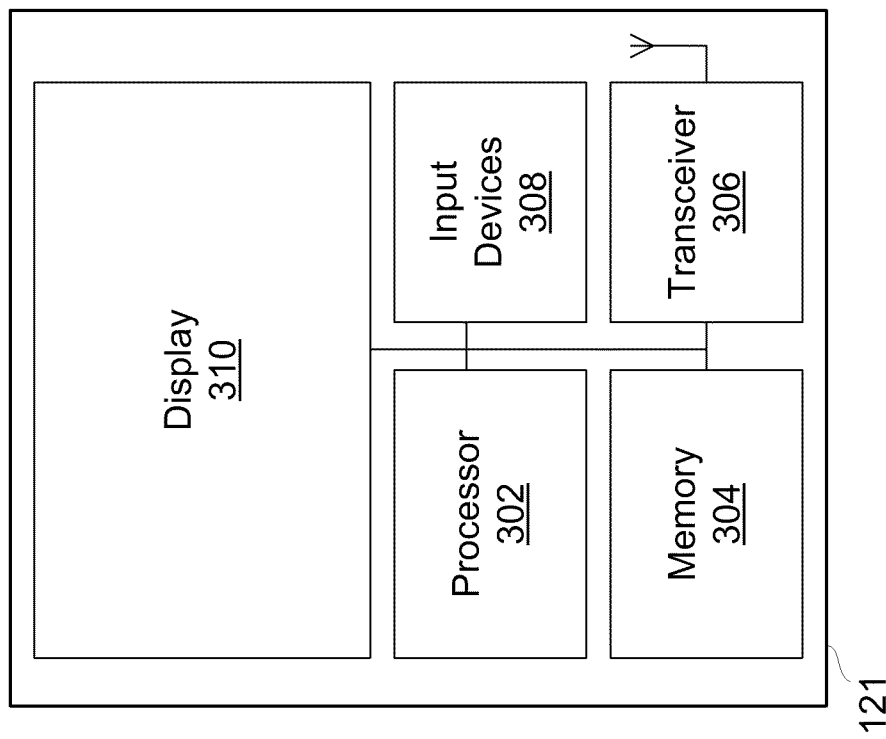
FIG. 3 is a simplified, conceptual block diagram of a mobile device in accordance with one embodiment.

Similarly, the systems and methods described herein may be implemented in any mobile device now known or later developed. Referring to FIG. 3, for example, a typical mobile device 121 will generally include one or more processors 302, one or more memory devices 304 (e.g., flash memory, hard drives, MicroSD cards, etc.), an RF transceiver module 306 (e.g., operating in accordance with IEEE 802.11, Zigbee, etc.), a display 310 (e.g., a touchscreen display), and input devices 308 (buttons, LEDs, etc.). In any given embodiment, additional electronic components may be present, including, typically, a power module (e.g., batteries, charging circuits, etc.), a peripheral interface, one or more external ports (e.g., USB, Firewire, etc.), an audio module, and one or more sensors such as acceleration sensors, orientation sensors, and proximity sensors (not illustrated).

In general, a computer program product in accordance with one embodiment comprises a computer usable medium (e.g., memory 304, an optical drive, a USB drive, or the like) having computer-readable program code embodied therein, wherein the computer-readable program code is adapted to be executed by processor 302 (working in connection with an operating system) to implement a method for generating a user interface and implementing the method described above. In this regard, the program code may be implemented in any desired language, and may be implemented as machine code, assembly code, byte code, interpretable source code or the like (e.g., via C, C++, Java, Actionscript, Objective-C, Javascript, CSS, XML, etc.).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method of providing communication between mobile devices within a wide area network using IP unicast communication and a wireless local area network using IP multicast communication, wherein the wide area network and the wireless local area network are coupled by a gateway component, the method comprising:

storing a public IP address of the gateway component within a mobile device;
  establishing data communication between the mobile device and the wireless local area network, a first unicast IP address being acquired by the mobile device in response to establishing the data communication with the wireless local area network;

storing the first unicast IP address within the mobile device;

joining the mobile device with a multicast group within the wireless local area network and registering the mobile device with the multicast group using a predetermined multicast IP address as a destination IP address and the first unicast IP address as a source address;

disconnecting the mobile device from data communication within the wireless local area network, thereby releasing the first unicast IP address acquired by the mobile device;

establishing data communication between the mobile device and the wide area network, a second unicast IP address being acquired by the mobile device in response to establishing the data communication with the wide area network;

storing the second unicast IP address with the public IP address of the gateway component and the first unicast IP address within the mobile device; and automatically sending a message to the public network address of the gateway component, via the wide area network, to specify the second unicast IP address as the source address for the mobile device within the multicast group.

2. The method of claim 1, wherein the multicast group is a Internet Group Management Protocol group.

3. The method of claim 1, wherein the mobile device is configured to provide walkie-talkie service.

4. The method of claim 1, where establishing the data communication includes providing simultaneous communications of one or more types selected from the group consisting of voice, data, video, text, and images.

5. A data communication system comprising:
a wide area network and a wireless local area network coupled by a gateway component; and
a mobile device;
wherein the mobile device is configured to store a public IP address of the gateway component, to establish data communication with the wireless local area network, thereby acquiring a first unicast IP address and storing the first unicast IP address, to join a multicast group within the wireless local area network by registering with the multicast group using a predetermined multicast IP address as a destination IP address and the first unicast IP address as a source address,
wherein the mobile device is further configured to disconnect from the wireless local area network, thereby releasing the first unicast IP address acquired by the mobile device, to establish data communication with the wide area network, thereby acquiring a second unicast IP address and storing the second unicast IP address with the public IP address of the gateway component and the first unicast IP address, and automatically sending a message to the public network address of the gateway component, via the wide area network, to specify the second unicast IP address as the source address for the mobile device within the multicast group.

6. The system of claim 5, wherein the multicast group is a Internet Group Management Protocol group.

7. The system of claim 5, wherein the mobile device is configured to provide walkie-talkie service.

8. The system of claim 5, where the mobile device is configured to provide simultaneous communications of one or more types selected from the group consisting of voice, data, video, text, and images.

9. The system of claim 5, wherein the mobile device includes logic configured to detect that an IP address or network has changed, communicating the first unicast IP address to the gateway component.

10. The system of claim 9, wherein the mobile device sends information to devices within WLAN while roaming between multiple networks.

11. A computer program product comprising a non-transitory computer-usable medium having computer readable program code embodied therein, said computer readable program code adapted to be executed to implement a multicast and unicast communication within a wire area network and a wireless local area network, comprising:
storing a public IP address of the gateway component within a mobile device;
establishing data communication between a the mobile device and the wireless local area network, a first unicast IP address being acquired by the mobile device in response to establishing the data communication with the wireless local area network;
storing the first unicast IP address within the mobile device;
joining the mobile device with a multicast group within the wireless local area network and registering the mobile device with the multicast group using a predetermined multicast IP address as a destination IP address and the first unicast IP address as a source address;
disconnecting the mobile device from data communication within the wireless local area network, thereby releasing the first unicast IP address acquired by the mobile device;
establishing data communication between the mobile device and the wide area network, a second unicast IP address being acquired by the mobile device in response to establishing the data communication with the wide area network;
storing the second unicast IP address within the mobile device with the public IP address of the gateway component and the first unicast IP address; and
automatically sending a message to the public network address of the gateway component, via the wide area network, to specify the second unicast IP address as the source address for the mobile device within the multicast group.

12. The computer program product of claim 11, wherein the multicast group is a Internet Group Management Protocol group.

13. The computer program product of claim 11, wherein the mobile device is configured to provide walkie-talkie service.

14. The computer program product of claim 11, where establishing the data communication includes providing simultaneous communications of one or more types selected from the group consisting of voice, data, video, text, and images.

15. The computer program product of claim 11, wherein the computer readable program code is provided within the mobile device.

* * * * *